United States Patent
Gehring et al.

(10) Patent No.: US 7,117,072 B2
(45) Date of Patent: Oct. 3, 2006

(54) METHOD OF DETECTING THE DOCKING OF VEHICLES

(75) Inventors: Ottmar Gehring, Kernen (DE); Carsten Haemmerling, Stuttgart (DE); Harro Heilmann, Ostfildern (DE); Andreas Schwarzhaupt, Oberrot (DE); Gernot Spiegelberg, Heimsheim (DE); Armin Sulzmann, Oftersheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/953,077

(22) Filed: Sep. 30, 2004

(65) Prior Publication Data
US 2005/0114005 A1   May 26, 2005

(30) Foreign Application Priority Data
Oct. 1, 2003   (DE) ............................. 103 45 748

(51) Int. Cl.
*G06F 11/30* (2006.01)
*G06G 3/00* (2006.01)

(52) U.S. Cl. ............................. 701/23; 172/28; 141/231

(58) Field of Classification Search .................. 701/23, 701/50, 401; 56/16.6; 172/28, 225, 226; 141/231; 461/1, 8
See application file for complete search history.

(56) References Cited

U.S. PATENT DOCUMENTS

| | | | | |
|---|---|---|---|---|
| 4,595,331 | A * | 6/1986 | Thompson et al. | 414/347 |
| 4,831,539 | A * | 5/1989 | Hagenbuch | 701/207 |
| 5,075,853 | A * | 12/1991 | Luke, Jr. | 701/25 |
| 5,154,561 | A * | 10/1992 | Lee | 414/138.3 |
| 5,163,001 | A * | 11/1992 | Luke, Jr. | 701/23 |
| 6,587,772 | B1 * | 7/2003 | Behnke | 701/50 |

\* cited by examiner

*Primary Examiner*—Dalena Tran
(74) *Attorney, Agent, or Firm*—Crowell & Moring LLP

(57) ABSTRACT

In a module for detecting the docking of a vehicle, changes of vehicle engine torque and rotational wheel speed of the vehicle are determined as a function of time. It is checked whether the change of the engine torque is >>0 and the change of the rotational wheel speed is <<0. If both of these conditions are met, docking is detected and the vehicle can be braked. The module may be implemented in the form of software.

15 Claims, 1 Drawing Sheet

METHOD OF DETECTING THE DOCKING OF VEHICLES

BACKGROUND AND SUMMARY OF THE INVENTION

This application claims the priority of German Patent Document No. 103 45 748.8, filed Oct. 1, 2003, the disclosure of which is expressly incorporated by reference herein.

The invention relates to a method of detecting the docking of a vehicle to a docking system.

Particularly in the case of autonomously driven vehicles (that is, vehicles which operate without a driver), such as may be utilized for example in a forwarding company yard, it is necessary to detect the end of a docking operation. When such a vehicle approaches a docking system, such as a loading ramp for loading or unloading, a semitrailer, container or trailer, it is necessary to detect the point in time at which the vehicle is docked, so that the vehicle can be braked in time.

In autonomously driven vehicles, it is known to provide switches which trigger braking when the vehicle comes in contact with a loading ramp. Alternatively, a distance measurement can take place, for example, by means of lasers, and braking can be implemented starting from a certain distance. Additional sensors are required for this purpose, however.

One object of the present invention is to provide a method for detecting docking of a vehicle without requiring additional sensors or switches.

This and other objects and advantages are achieved by the method according to the invention, in which changes in quantities that are indicative of longitudinal velocity of the vehicle and engine torque are monitored. If the change of the velocity quantity is below a defined first value and the change of the engine torque quantity is above a defined second value, it can be determined that a docking has taken place.

The longitudinal velocity a vehicle (or a quantity indicative of it) and the engine torque (or a quantity indicative of it) are detected in all events for other purposes, such as controlling the engine torque. Moreover, temporal changes of the detected quantities can be determined easily, without any additional switches or sensors on the vehicle, in a software module. For this purpose, only the velocity quantity and the engine torque quantity have to be fed to the software module.

When the vehicle comes in contact with a loading ramp, a semitrailer or a trailer, the velocity drops abruptly; and as a result of rotational speed control, the actual engine torque rises simultaneously. Particularly when the change of the engine torque quantity is >>0 and the change of the velocity quantity is <<0, docking is indicated, and braking of the vehicle can be initiated. A Human interaction is not required for braking the vehicle.

In an advantageous variant of the method, automatic braking takes place when a docking is detected. In particular, when a change of the velocity quantity is below the defined first value and a change of the engine torque quantity is above the defined second value, a braking command can given to the braking system and/or the braking can take place by way of the engine. For example, a zero torque can be defined for the engine, or the engine can be returned to its idling rotational speed. Depending on the further development of the transmission line, the clutch can also be opened when a docking is detected. The braking command and the zero torque can be transmitted (via a CAN bus which is already present in the vehicle) to the braking system and the engine control, for example, by a software module which determines whether a docking is taking place.

In a preferred variant of the method according to the invention, the change of the velocity quantity is monitored by reference to the change of rotational wheel speed of at least one vehicle wheel, particularly a rear wheel. As a rule, in the case of vehicles, the longitudinal velocity is determined by measuring a quantity proportional to the longitudinal velocity and correlated therewith. A quantity which is particularly easy to measure is the rotational wheel speed. A change of the rotational wheel speed is accompanied by a change of the longitudinal velocity of the vehicle. Thus, the change of the longitudinal velocity can be determined in a simple manner from the measured rotational wheel speed. However, it may also be provided that the rotational wheel speed is fed directly to the software module and is used to determine whether a docking is taking place.

When the longitudinal velocity of the vehicle is monitored (particularly whether the longitudinal velocity is below a defined velocity value), docking can be detected unambiguously. As a rule, docking is preceded by a maneuvering operation, so that the vehicle drives at a low longitudinal velocity. If a rapid change of the rotational wheel speed and engine torque occurs in such a situation, this is most probably a docking. The detection of a slow longitudinal velocity (particularly a velocity below a threshold value) can be provided as a prerequisite for the detection of the docking. It is conceivable, for example, to determine the changes of the engine torque quantity and of the velocity quantity with respect to time only when the vehicle drives at a longitudinal velocity below the threshold value. In this case, it is advantageous for the longitudinal velocity of the vehicle to be used as the velocity quantity.

It is particularly advantageous to detect and analyze additional vehicle parameters for identifying a docking, particularly vehicle parameters describing the condition of the transmission line. One such parameter which may be used for this purpose is the engaged gear of a transmission, from which the driving direction and the transmission ratio can be detected. It can, for example, be detected whether the reverse gear is engaged. Only then can a docking be involved. The detection of additional vehicle parameters can therefore enhance the reliable detection of the docking. These preferably include the condition of a clutch (engaged or released) situated in the transmission line and the rotational engine speed, from which the rotational input speed and the rotational output speed of the transmission are obtained.

In addition, the object of the invention is achieved by a module to which an engine torque quantity describing the engine torque and a velocity quantity describing the longitudinal velocity of the vehicle are fed, and which has devices for determining change of the engine torque quantity and of the longitudinal velocity quantity, which are connected with devices for determining whether a docking is taking place. Without providing additional sensors on the vehicle, such a module can determine reliably whether a docking of the vehicle to a docking system is taking place, and a braking maneuver can be initiated. The module can be constructed as a hardware module.

As an alternative and preferably, the invention can be constructed as a software module, and the process can be performed by a microprocessor which is otherwise present in the vehicle. The process can thus be implemented and carried out in a particularly cost-effective manner, and no additional hardware is required for detecting the docking.

When additional input quantities describing additional vehicle parameters, such as the velocity or status quantities of the transmission and drive train, are supplied to the module, the decision as to whether a docking has taken place can be based on a more reliable foundation.

In a particularly preferred embodiment, the module is connected by way of a data line, particularly a CAN bus, with the braking system and/or the transmission line control (such as the engine, transmission) of the vehicle. Ordinarily, a CAN bus is present in the vehicle anyway. Thus, no new data lines are necessary for transmitting the braking command. This means that existing autonomously driving vehicles can be retrofitted particularly easily with the module according to the invention.

Other objects, advantages and novel features of the present invention will become apparent from the following detailed description of the invention when considered in conjunction with the accompanying drawings.

DETAILED DESCRIPTION OF THE DRAWINGS

Figure 1:
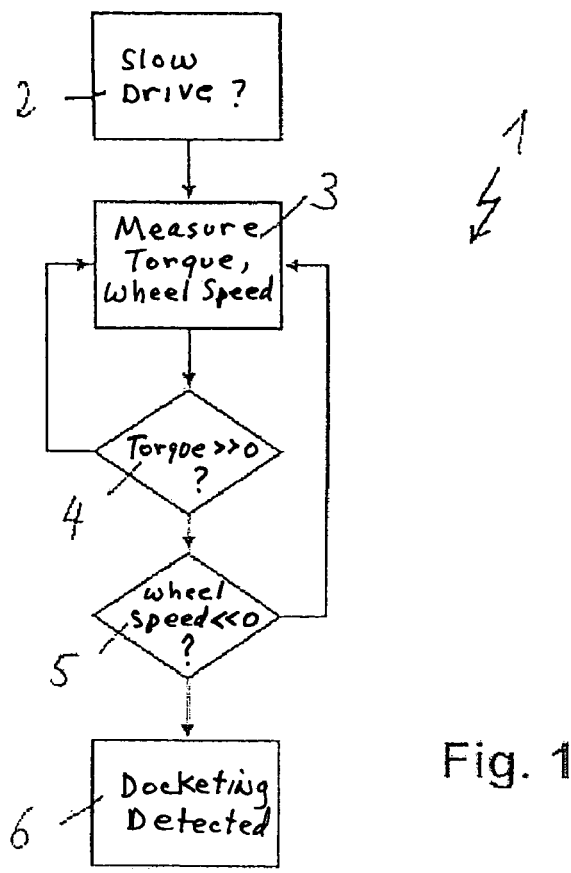
FIG. 1 is a flow chart of the method according to the invention.

In the block diagram 1 of FIG. 1, it is checked in a first block 2 whether the vehicle is moving slowly; particularly whether it is driving below a defined longitudinal velocity. According to the illustrated embodiment, a change to block 3 takes place only in the event that a slow drive is detected. In block 3, the engine torque and the rotational wheel speed are to be measured. On the basis of these measurements, it is checked in step 4 whether the change of the engine torque is >>0. If not, the process returns to step 3. If, however, engine torque is >>0, in step 5 it is checked whether the change of the rotational wheel speed is <<0. If so, a determination is made in block 6 that a docking has taken place, and consequential measures, such as a braking of the vehicle, can be initiated. If the check in step 5 has the result that the change of the rotational wheel speed is not lower than a defined value, particularly not <<0, the path leads back to block 3.

Figure 2:
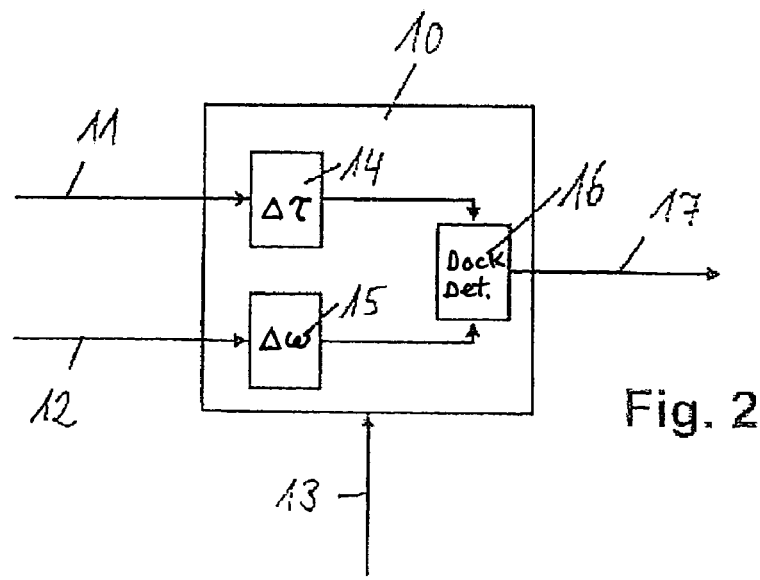
FIG. 2 is a schematic view of a module for detecting the docking.

FIG. 2 illustrates a software module 10, to which the engine torque is fed at an input 11, and the rotational wheel speed of a rear wheel of the vehicle is fed at a second input 12. In addition, a third input 13 is provided for feeding additional input quantities which describe additional vehicle parameters. The module 10 includes a unit 14 which determines the change of the engine torque, and a unit 15 which determines the change of the rotational wheel speed. The latter units are connected with a unit 16 for determining whether a docking has taken place. Finally, the output of the 16 is connected with the braking system and the engine control in order to give the corresponding demands for braking the vehicle, and to define a zero torque for the engine.

In the module 10, particularly a software module, for detecting a docking of a vehicle, the change of the engine torque and the change of the rotational wheel speed of a wheel of the vehicle are determined as a function of time, and it is checked whether the change of the engine torque is >>0 and the change of the rotational wheel speed is <<0. If these conditions have been met, a docking is detected and the vehicle can be braked. Docking can thus be detected without external sensors on the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method of detecting docking of a vehicle to a docking system, said method comprising:
    a) monitoring changes of a first quantity that is indicative of longitudinal velocity of the vehicle;
    b) monitoring changes a second quantity that is indicative of engine torque;
    c) determining whether a change of the first quantity is less than a defined first value;
    d) determining whether a change of the second quantity is greater than a defined second value; and
    e) determining that a docking has taken place when both c) and d) have been met at the same time.

2. The method according to claim 1, further comprising automatically braking the vehicle when a docking has been detected.

3. The method according to claim 2, wherein the first quantity comprises rotational wheel speed of at least one vehicle wheel.

4. The method according to claim 3, wherein said vehicle wheel is a rear wheel.

5. The method according to claim 1, wherein the first quantity comprises longitudinal velocity of the vehicle.

6. The method according to claim 5, wherein it is monitored whether the longitudinal velocity is below a defined velocity value.

7. The method according to claim 1, wherein:
    additional vehicle parameters are detected and analyzed for detecting docking; and
    said additional vehicle parameters include at least a status of the drive train.

8. A module comprising:
    first input means for receiving a first input quantity indicative of the engine torque;
    second input means for receiving a second input quantity indicative of longitudinal velocity of the vehicle;
    first determining means for determining a change of the first input quantity;
    second determining means for determining a change of the second input quantity; and
    third determining means connected to receive outputs from said first and second determining means for determining, based on said outputs, whether a docking of the vehicle to a docking system is occurring.

9. The module according to claim 8, wherein the module comprises a software module.

10. The module according to claim 9, further comprising third input means for receiving additional input quantities which are indicative of additional vehicle parameters.

11. The module according to claim 10, further comprising a data line for connecting an output of the module with at least one of a braking system and a drive train control of the vehicle.

12. The module according to claim 11, wherein the data line comprises a CAN bus.

13. The method according to claim 8, wherein said third determining means determines that said vehicle has docked whenever a rapid increase of said first input torque occurs at the same time as a rapid decrease of said second input quantity.

14. The method according to claim 13, wherein:
said rapid increase of said first input quantity comprises said increase >>0; and
said rapid decrease of said second input quantity comprises said increase <<0.

15. A method for detecting docking of a vehicle to a docking system, said method comprising:
a monitoring longitudinal acceleration of the vehicle;
monitoring engine torque of the vehicle; and
determining that the vehicle has docked when a rapid longitudinal deceleration of the vehicle occurs at the same time that said engine torque undergoes a rapid increase.

* * * * *